(No Model.)
J. L. JOYCE.
PRUNING IMPLEMENT.
No. 517,385. Patented Mar. 27, 1894.
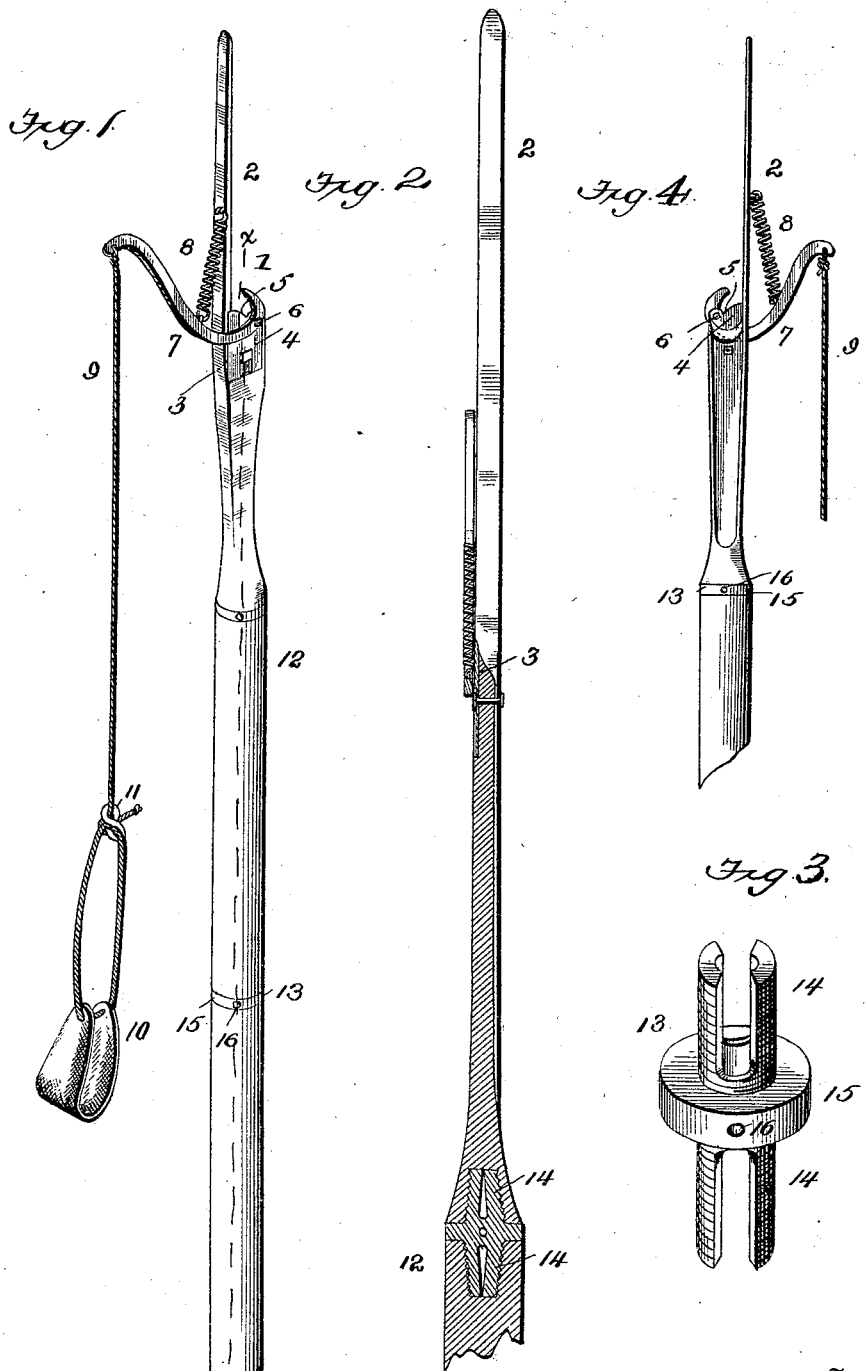
Witnesses
John Lannin
Chas. S. Hyer
Inventor
Joseph L. Joyce
By John Wedderburn
his Attorney

UNITED STATES PATENT OFFICE.

JOSEPH L. JOYCE, OF SOUTH EGREMONT, MASSACHUSETTS.

PRUNING IMPLEMENT.

SPECIFICATION forming part of Letters Patent No. 517,385, dated March 27, 1894.

Application filed September 14, 1893. Serial No. 485,469. (No model.)

*To all whom it may concern:*

Be it known that I, JOSEPH L. JOYCE, a citizen of the United States, and a resident of South Egremont, in the county of Berkshire and State of Massachusetts, have invented certain new and useful Improvements in Pruning-Knives; and I do hereby declare the following to be a full, clear, and exact description of the invention, such as will enable others skilled in the art to which it appertains to make and use the same.

This invention relates to pruning knives, and has for its object to provide simple and effective means for cutting small limbs and shoots from trees by a thrust or direct blow, and also having means by which a shear cut can be made on said outside branches or ends of branches as do not, from their small size or position offer sufficient resistance to be severed by a blow given direct.

With these and other objects in view, the invention consists of the construction and arrangement of the several parts as will be more fully hereinafter described and claimed.

In the drawings: Figure 1 is a perspective view of a pruning-knife, embodying the invention. Fig. 2 is a section on the line *x—x*, Fig. 1, on an enlarged scale. Fig. 3 is a detail perspective view of the screw connecting the handle sections. Fig. 4 is an elevation of the upper part of the pruning-knife, looking toward the side thereof, opposite to that shown by Fig. 1.

Similar numerals of reference are employed to indicate corresponding parts in the several figures.

Referring to the drawings, the numeral 1 designates the cutter-head with a guard finger 2 projecting some distance beyond the same, and extending from one side thereof. The upper portion of one side of the cutter head is formed with a recess 3, in which is removably fitted a cutter 4, having an upper sharpened edge which lies close to the guard finger and in rear of the said guard finger the said cutter head is cut away as at 5, in order to permit the cutting edge to have full and unimpeded operation. The cutter at one side is formed with a lug or ear 6, to which is pivotally connected a pruning-shear 7, of compound curved form, and thereto is also connected the lower end of a coiled spring 8, whose upper end is attached to the guard finger to thereby normally hold the pruning shear in open position. The said pruning shear is so arranged that it co-acts with the cutting edge of the cutter as fully shown and to the outer end thereof is attached a rope or cord 9, which is formed with a loop at its lower end, engaging a broadened grip 10, and in connection with the said cord or rope is an 8-shaped wire loop or plate 11, having double openings therein to engage the cord and form a means of ready adjustment therefor, to shorten or lengthen the same, according as the necessity of the operation may require.

Secured to the cutter head 1 is one or more handle sections 12 of any suitable length and connected to each other and the cutter head by a screw union 13, which consists of two screw shanks 14 with an intermediate collar 15 with an opening therethrough as at 16, in order to provide means for inserting a tool or hook to turn the same and thereby join the handle sections or one handle section with the cutter head as will be readily understood. The engaging ends of the cutter head and the handle section to be fitted thereto or of the handle sections themselves are formed with smooth holes extending longitudinally and of less diameter than the shanks of the engaging screw union. The screw shanks are slotted longitudinally as at 17 to compensate for the diameter of these holes and when the parts are fitted together, the screw works its way into the wood, and makes a firm joint in view of the construction of the threads.

It will be understood that the handle will be of sufficient length to permit the operator to do his work while standing upon the ground and in operating upon a limb to be severed, the guard finger is caused to rest against the limb to be severed, in order to prevent any other limbs except that to be operated upon from being cut, and the handle is then given a full forward blow to bring the edge of the cutter against the limb and disconnect the same. The guard finger also permits a limb to be severed close to the body of the tree without any injury to the tree or to any portion except that which is designed to be detached, and the knife or cutter is of such shape that by giving the cutting blow the guard finger supports the limb, being cut so that the severance is easy and complete.

It will be understood that the pruning-shear will be readily used for clipping off ends of branches upon which a cutting blow could not be delivered with effect, or such outside limbs or branches which are too small to be otherwise severed. The spring attached to the pruning-shear is intended to always hold the said shear open and away from the cutting edge of the cutter to keep the said edge exposed for receiving the limb or branch to be cut. And the said spring also acts as a stop to the lever, going back only to a certain point. The lever is operated by passing the loop on the cord or rope, up on the arm above the elbow, and moving the guard finger forward on the limb to be cut, until the edge of the knife is struck against the limb to be severed. A sudden downward movement of the hand on the handle, both hands being on the handle 12, the one passing through the loop being under and thereby acting on the lever, closes the shear and severs the limb. In many cases, the limb will be cut by a simple forward movement to the handle after the knife hits the limb by a one-arm movement, holding the other arm stationary; the lever then acting as a stay or resistance and the limb will be cut without the direct shear lever motion or downward movement of the hand on the handle.

It will be also understood that more than one guard finger can be employed without materially affecting the construction of the device or departing from the nature or spirit of the invention.

It is also obviously apparent that many other minor changes in the proportion and form of the several parts might be made and substituted for those shown and described without in the least departing from the nature or spirit of the invention.

Having thus described the invention, what is claimed as new is—

1. A pruning device consisting of a cutter head, and cutter removably attached to one side of said cutter head, and having its cutting edge on the upper end of the same, a guard finger integrally formed with the said cutter head and projecting upwardly therefrom at one side above the cutter so as to present a flat surface at right angles to the position of the cutter, a pruning shear of crooked form having an upper curved edge and pivoted to one side of the cutter, a spring attached to the guard and to the said pruning shear and a cord or rope attached to the upper edge of the said pruning shear and having an adjustable loop at the lower portion of the same, substantially as and for the purposes specified.

2. In a handle for a pruning device, the combination of a series of sections with screw openings in their opposite ends and screws with slots extending longitudinally thereof and connected to an intermediate collar with an opening therein, substantially as described.

In testimony whereof I have signed this specification in the presence of two subscribing witnesses.

JOSEPH L. JOYCE.

Witnesses:
DANIEL S. KNOWLTON,
ARTHUR R. JOYCE.